Nov. 15, 1932.  C. A. MARIEN  1,887,769
PISTON SKIRT EXPANDING SPRINGS
Filed Jan. 25, 1932
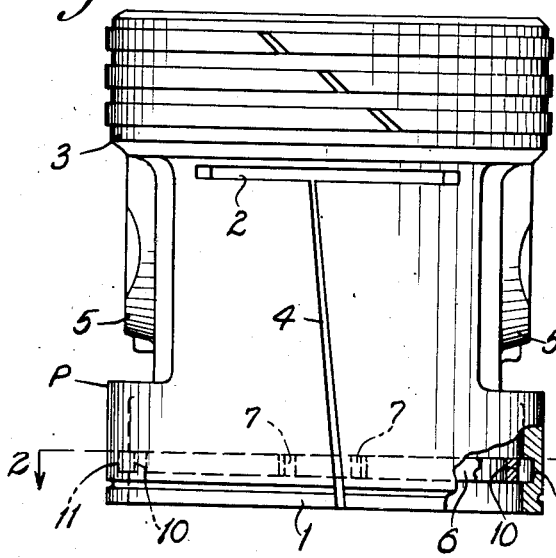
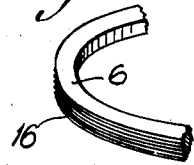
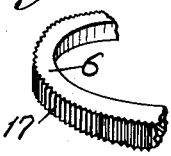
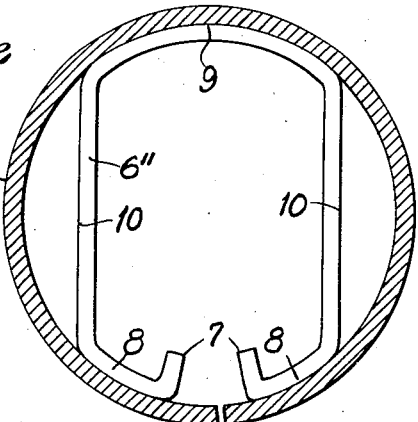
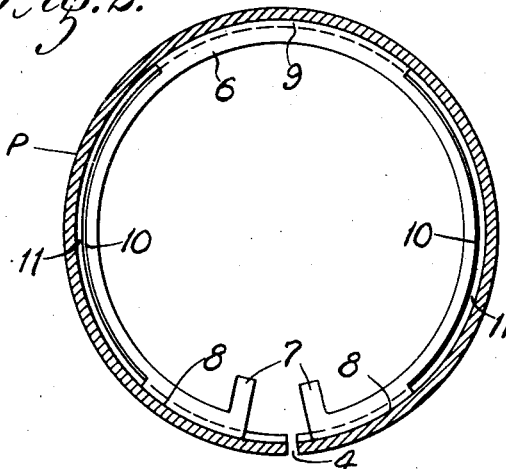
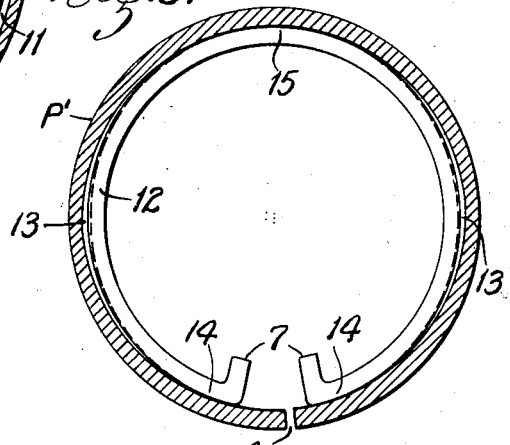
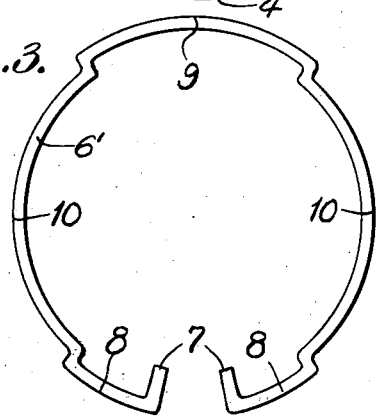
INVENTOR:
CHARLES A. MARIEN.
BY Harry A. Zeimer
ATTORNEY.

Patented Nov. 15, 1932

1,887,769

UNITED STATES PATENT OFFICE

CHARLES A. MARIEN, OF ST. LOUIS, MISSOURI, ASSIGNOR TO RAMSEY ACCESSORIES MANUFACTURING CORPORATION, OF ST. LOUIS, MISSOURI, A CORPORATION OF MISSOURI

PISTON SKIRT EXPANDING SPRINGS

Application filed January 25, 1932. Serial No. 588,563.

My invention has relation to improvements in piston skirt expanding springs and it consists in the novel features of construction more fully set forth in the specification and pointed out in the claims.

The present invention is an improvement over that shown in Patent No. 1,806,416, granted May 19, 1931, to Harold F. Phillips, and has for its object the simplification of the expanding spring and its application to a piston. In the invention of the patent referred to the expander is of a peculiar form and must be held in place by suitable formations in the piston. In the present invention the expander need not necessarily depend upon formations in the piston to hold it in place but is so constructed that if desired no alterations need be made in the piston as the expander may be held in place by suitable gripping devices on the expander itself.

A further object of the present invention is to provide an expander that may be disposed within a piston skirt so that the greatest amount of piston expansion may be obtained across any diameter thereof. Further and other advantages inherent in the invention will be better apparent from a detailed description thereof in connection with the accompanying drawing, in which:

Figure 1 is a side elevation with parts broken away of a piston embodying my improved skirt expander; Fig. 2 is a horizontal cross-section taken on the line 2—2 of Fig. 1; Figs. 3 and 4 are plan views of modified forms of expanders; Fig. 5 shows a modification of the expander, the general shape of which is circular; Figs. 6, 7 and 8 are perspective views of fragments of modified forms of expanders showing their outer faces provided with suitable formations for gripping the wall of the piston.

Referring to the drawing, P represents an aluminium or alloy piston of a common construction having its skirt 1 provided with a horizontal slot 2 immediately below the bottom ring land 3, the skirt also being provided with an inclined longitudinally extending slot 4 extending from slot 2 to the bottom of the piston skirt. The slot 4 is approximately midway between the wrist pin bosses 5, 5 and, as well understood, is provided for the purpose of allowing the skirt to contract circumferentially to compensate for the expansion caused by the heat during operation. As well understood in the art, aluminium or alloy pistons have little resilience and soon become permanently set so that subsequent wear results in a teetering action of the piston during reciprocation thereof.

In order to impart resilience to the piston skirt so that it will hug the cylinder wall under all operating conditions an expanding element in the shape of an open ring 6 is inserted in the lower part of the skirt 1. In the principal embodiment of the invention the ring 6 has inwardly turned terminal portions 7, 7 immediately adjacent to which are the piston expanding parts 8, 8 and opposite to which is the piston expanding part 9. Between piston expanding parts 8, 8 and 9 are recessed parts 10, 10. The outer faces of the piston parts 8, 8 and 9, which are adapted to engage the inner surface of the piston skirt, coincide with arcs of the same circle, while the outer faces of the recessed parts 10, 10 coincide with arcs of a somewhat smaller circle so that when the expander 6 is disposed in an annular recess 11 formed on the inside of skirt 1, the parts 8, 8 and 9 will be seated in said recess and exert tension outwardly on the skirt while the parts 10, 10 will be spaced from the skirt, and, of course, exert no tension thereon. In practice the diameter across the expander from either face 8 to face 9 is substantially the same as that of the outside surface of the piston skirt before the expander is inserted therein. The expander therefore must be contracted, preferably by applying a pair of pliers to the terminal portions 7, 7 and drawing the expander ends together before it can be inserted into the groove 11 in the piston. On contracting the expander in this manner it may readily be placed within the skirt with its parts 8, 8 on either side of the slot 4, or it may be rotated to some other position. Ordinarily it is more desirable that the skirt be expanded across the diameter at right angles to the bosses 5, 5, but if an old piston is provided with an expander and the wear on the piston surface is greater at some particular point the expander may be rotated so as to cause the skirt to be expanded the greatest amount at the point where it shows the greatest wear.

In the modification shown in Figs. 3 and 4 the same principles are embodied as are in the main form, although the expanders 6' and 6" are formed by properly bending a suitable piece of wire.

In the modification shown in Fig. 5 the expander 12 is of a generally circular shape and is adapted to be fitted into arcuate recesses 13, 13 formed on the inner surface of the skirt of piston $p'$, said recesses being deepest at the middle and gradually merging with the inner surface of the piston skirt, against which the piston expanding parts 14, 14 and 15 bear. In this form of expander the recesses 13, 13 furnish relief so that the pressure on the piston skirt will gradually diminish toward the points at right angles to the piston slot 4, giving substantially the same effect as is obtained in the main form.

In Figs. 6, 7 and 8 I show the outer faces 16, 17 and 18 respectively of the expanders provided with suitable formations for gripping the wall of the piston. In Fig. 6 the formations take the shape more or less of threads, in Fig. 7 these formations are vertically extending sharp edged ridges, and in Fig. 8 the surface may be referred to as knurled. The thread-like formations of Fig. 6 are particularly effective in preventing bodily displacement of the expander in the piston while the ridge formations of Fig. 7 are effective to prevent a rotation of the expander relative to the piston skirt. The knurled surface of Fig. 8 combines the properties of the surfaces shown in Figs. 6 and 7. Expanders having such gripping formations on their outer surfaces may be used effectively, if desired, within a piston skirt without being seated in a recess, such as 11.

Having described my invention, I claim:

1. In combination with a piston having a longitudinally slotted skirt and an annular groove in the inner surface of said skirt, a spring expanding element of substantially circular shape, and having oppositely disposed expanding parts described by a common radius, disposed in said groove, and other intermediate parts lying within the circle describing said expanding parts.

2. In combination with a piston having wrist pin bosses and a slotted skirt, a spring expanding element disposed within said slotted skirt, said element being of substantially annular shape and having oppositely disposed arcuate expanding parts in contact with the parts of the skirt at right angles to the axis of said bosses, and intermediate parts lying within the circle describing said expanding parts and in non-contacting relation with the piston skirt.

In testimony whereof I hereunto affix my signature.

CHARLES A. MARIEN.